United States Patent
Lee et al.

(10) Patent No.: US 10,785,778 B2
(45) Date of Patent: Sep. 22, 2020

(54) METHOD FOR HANDLING FOR AN UPLINK SPLIT OPERATION IN WIRELESS COMMUNICATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 16/100,739

(22) Filed: Aug. 10, 2018

(65) Prior Publication Data

US 2019/0069308 A1    Feb. 28, 2019

Related U.S. Application Data

(60) Provisional application No. 62/544,777, filed on Aug. 12, 2017.

(51) Int. Cl.
| | |
|---|---|
| H04W 4/00 | (2018.01) |
| H04W 72/10 | (2009.01) |
| H04W 28/06 | (2009.01) |
| H04W 24/10 | (2009.01) |
| H04W 72/04 | (2009.01) |
| H04W 76/15 | (2018.01) |
| H04W 28/08 | (2009.01) |
| H04W 28/02 | (2009.01) |

(52) U.S. Cl.
CPC ........... *H04W 72/10* (2013.01); *H04W 24/10* (2013.01); *H04W 28/06* (2013.01); *H04W 28/085* (2013.01); *H04W 72/042* (2013.01); *H04W 76/15* (2018.02); *H04W 28/0278* (2013.01); *H04W 28/08* (2013.01)

(58) Field of Classification Search
None
See application file for complete search history.

(56) References Cited

U.S. PATENT DOCUMENTS

| | | | |
|---|---|---|---|
| 2009/0190554 A1* | 7/2009 | Cho | H04L 1/1874 370/331 |
| 2010/0118781 A1* | 5/2010 | Petrovic | H04L 1/1887 370/328 |

(Continued)

*Primary Examiner* — Gerald A Smarth
(74) *Attorney, Agent, or Firm* — Lee, Hong, Degerman, Kang & Waimey

(57) ABSTRACT

The present invention relates to a wireless communication system. More specifically, the present invention relates to a method and a device for handling for an uplink split operation in wireless communication system, the method comprising: generating and/or receiving second data available for transmission in a PDCP entity, and determining a RLC entity to be used for submitting the second data based on first data volume, if second data volume is larger than a first threshold and less than a second threshold; indicating the second data volume to a first MAC entity associated with a primary RLC entity, if the first data volume is less than the first threshold; and indicating the second data volume to both the first MAC entity associated with the primary RLC entity and a second MAC entity associated with a secondary RLC entity, if the first data volume is larger than the second threshold.

14 Claims, 14 Drawing Sheets

(56) References Cited

U.S. PATENT DOCUMENTS

| | | | |
|---|---|---|---|
| 2012/0275381 A1* | 11/2012 | Kim | H04W 74/08 |
| | | | 370/328 |
| 2013/0242859 A1* | 9/2013 | Celik | H04L 1/1841 |
| | | | 370/328 |
| 2015/0181461 A1* | 6/2015 | Kim | H04W 74/0833 |
| | | | 370/236 |
| 2016/0037526 A1* | 2/2016 | Kim | H04W 76/27 |
| | | | 370/329 |
| 2016/0249232 A1* | 8/2016 | Uchino | H04W 80/02 |
| 2016/0286429 A1* | 9/2016 | Chen | H04W 28/0278 |
| 2017/0111927 A1* | 4/2017 | Kim | H04W 72/1284 |
| 2017/0135151 A1* | 5/2017 | Fujishiro | H04W 36/14 |
| 2018/0027443 A1* | 1/2018 | Lee | H04W 80/02 |
| | | | 370/329 |
| 2018/0352468 A1* | 12/2018 | Futaki | H04W 88/10 |

* cited by examiner

FIG. 3
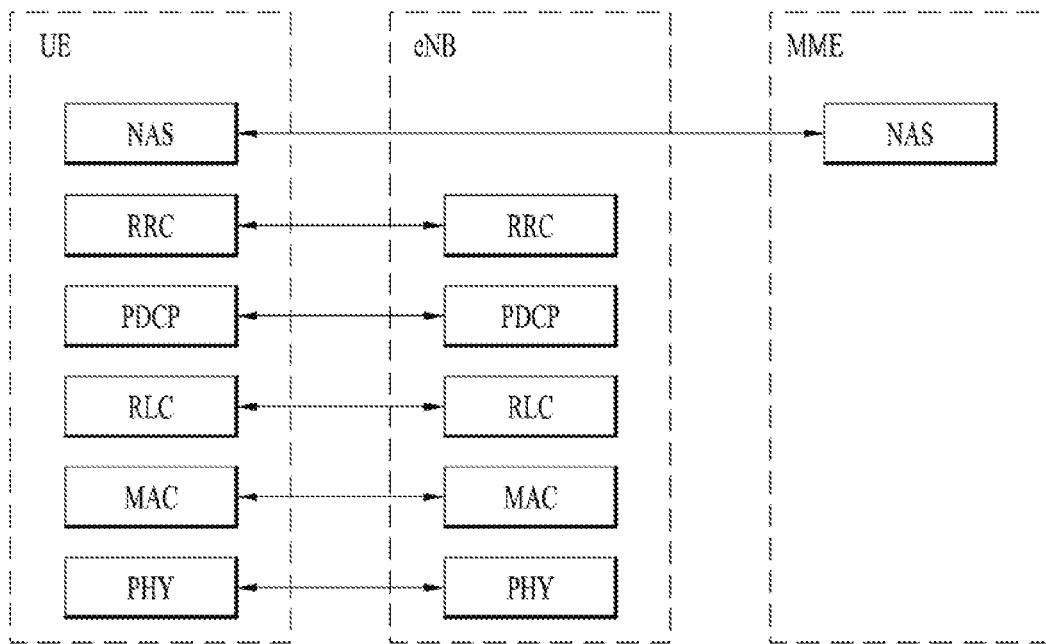
(a) Control-Plane Protocol Stack
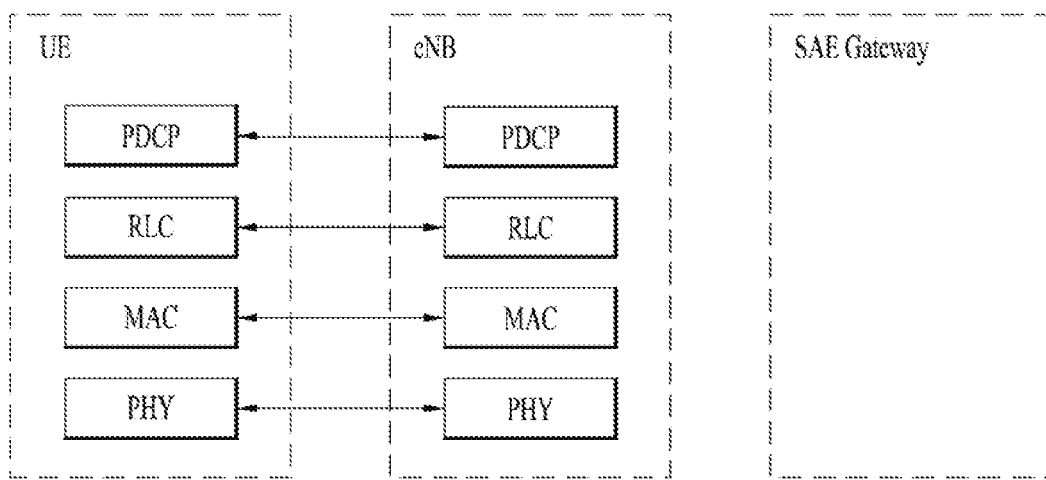
(b) User-Plane Protocol Stack FIG. 5
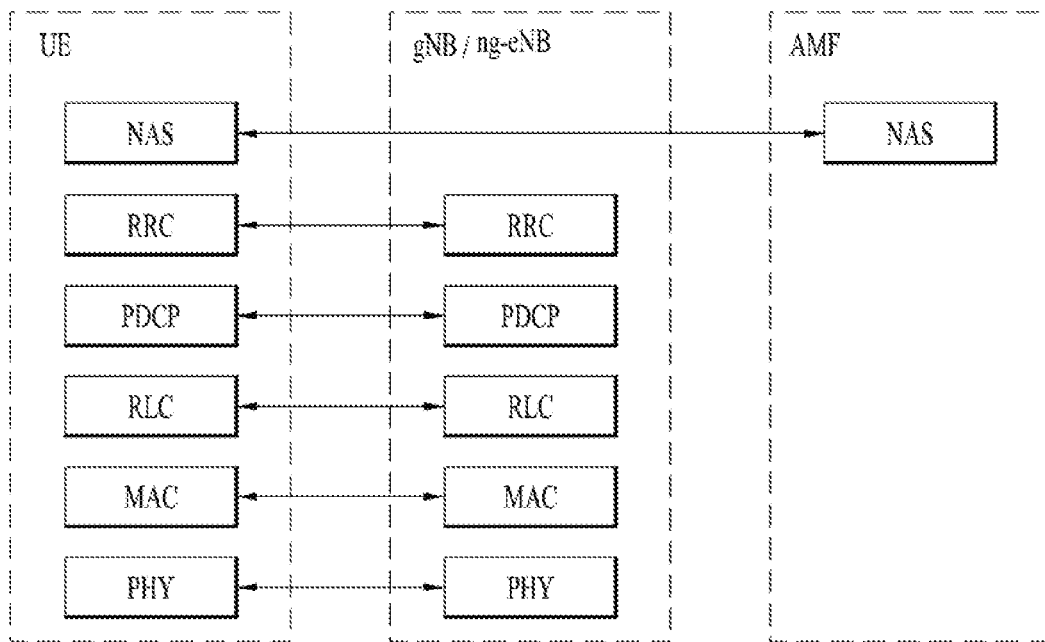
(a) Control-Plane Protocol Stack
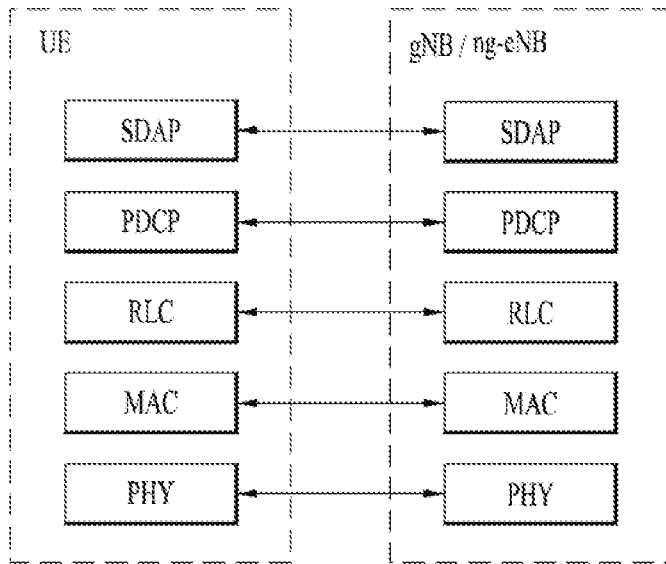
(b) User-Plane Protocol Stack

METHOD FOR HANDLING FOR AN UPLINK SPLIT OPERATION IN WIRELESS COMMUNICATION SYSTEM AND A DEVICE THEREFOR

CROSS-REFERENCE TO RELATED APPLICATIONS

Pursuant to 35 U.S.C. § 119(e), this application claims the benefit of U.S. Provisional Patent Application No. 62/544,777, filed on Aug. 12, 2017, the contents of which are all hereby incorporated by reference herein in their entirety.

BACKGROUND OF THE INVENTION

Field of the Invention

The present invention relates to a wireless communication system and, more particularly, to a method for handling for an uplink split operation in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard.

FIG. 5 is a diagram showing a control plane and a user plane of a radio interface protocol between a UE and a NG-RAN based on a 3rd generation partnership project (3GPP) radio access network standard.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
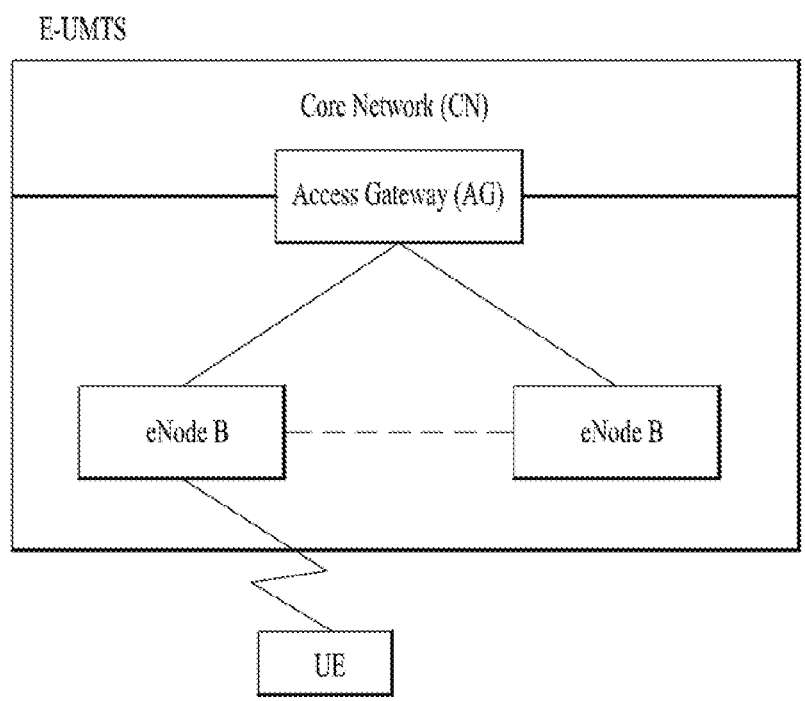
FIG. 1 is a diagram showing a network structure of an Evolved Universal Mobile Telecommunications System (E-UMTS) as an example of a wireless communication system.
Figure 2A:
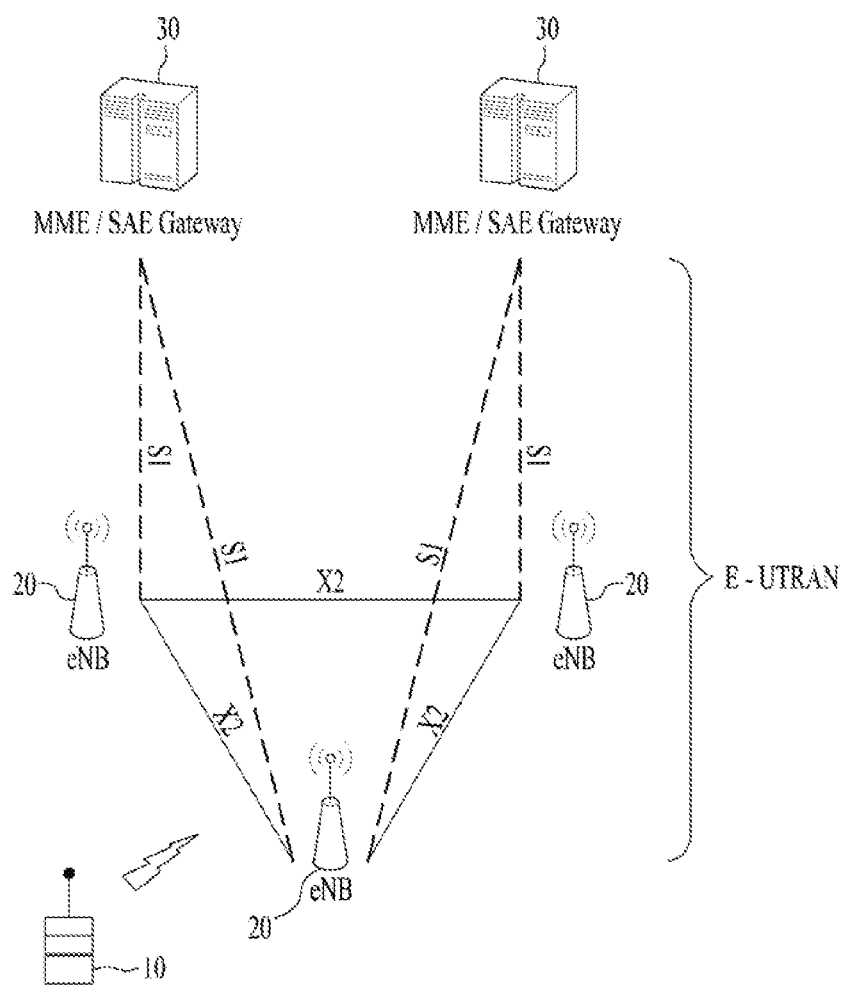
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
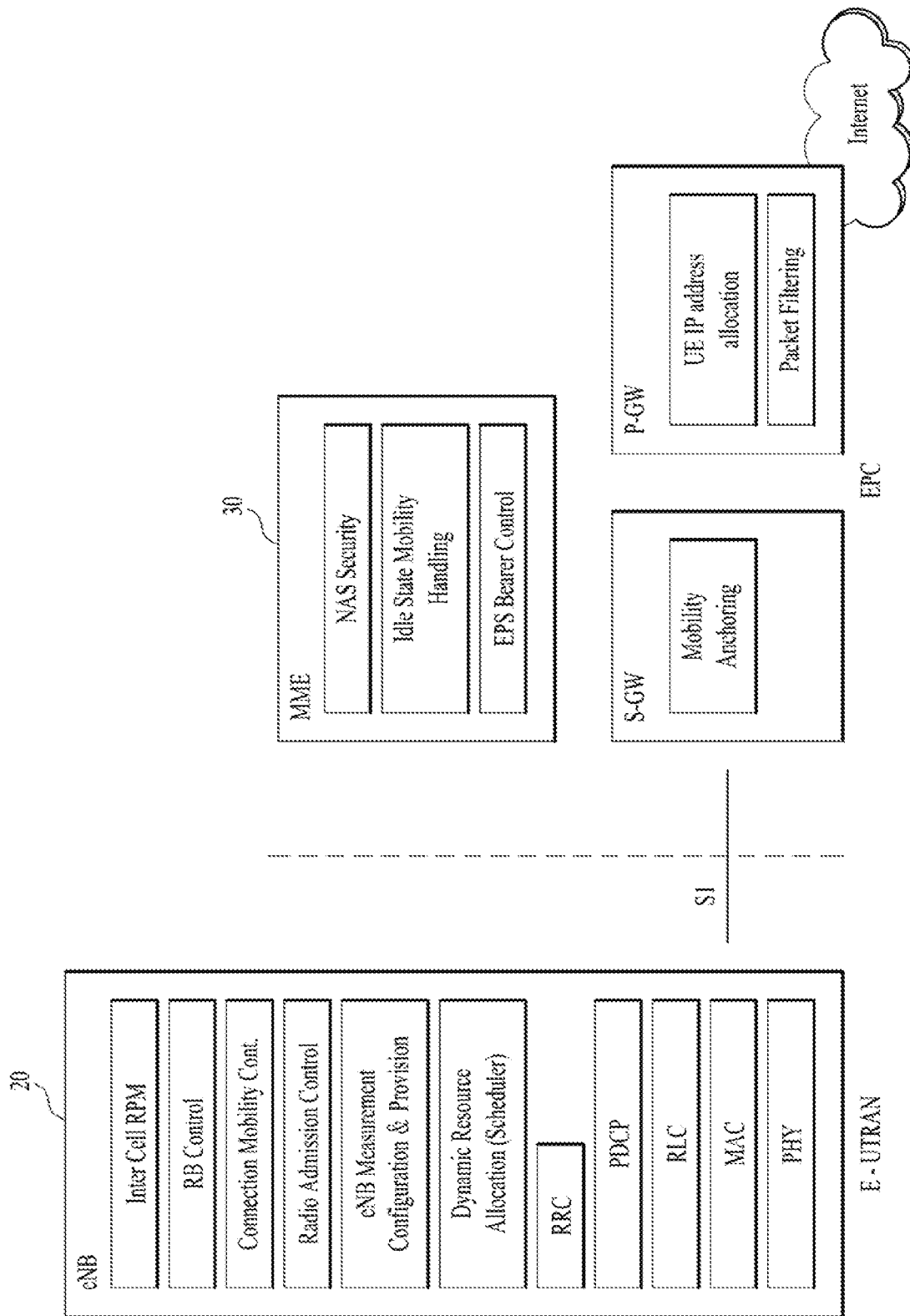
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signalling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
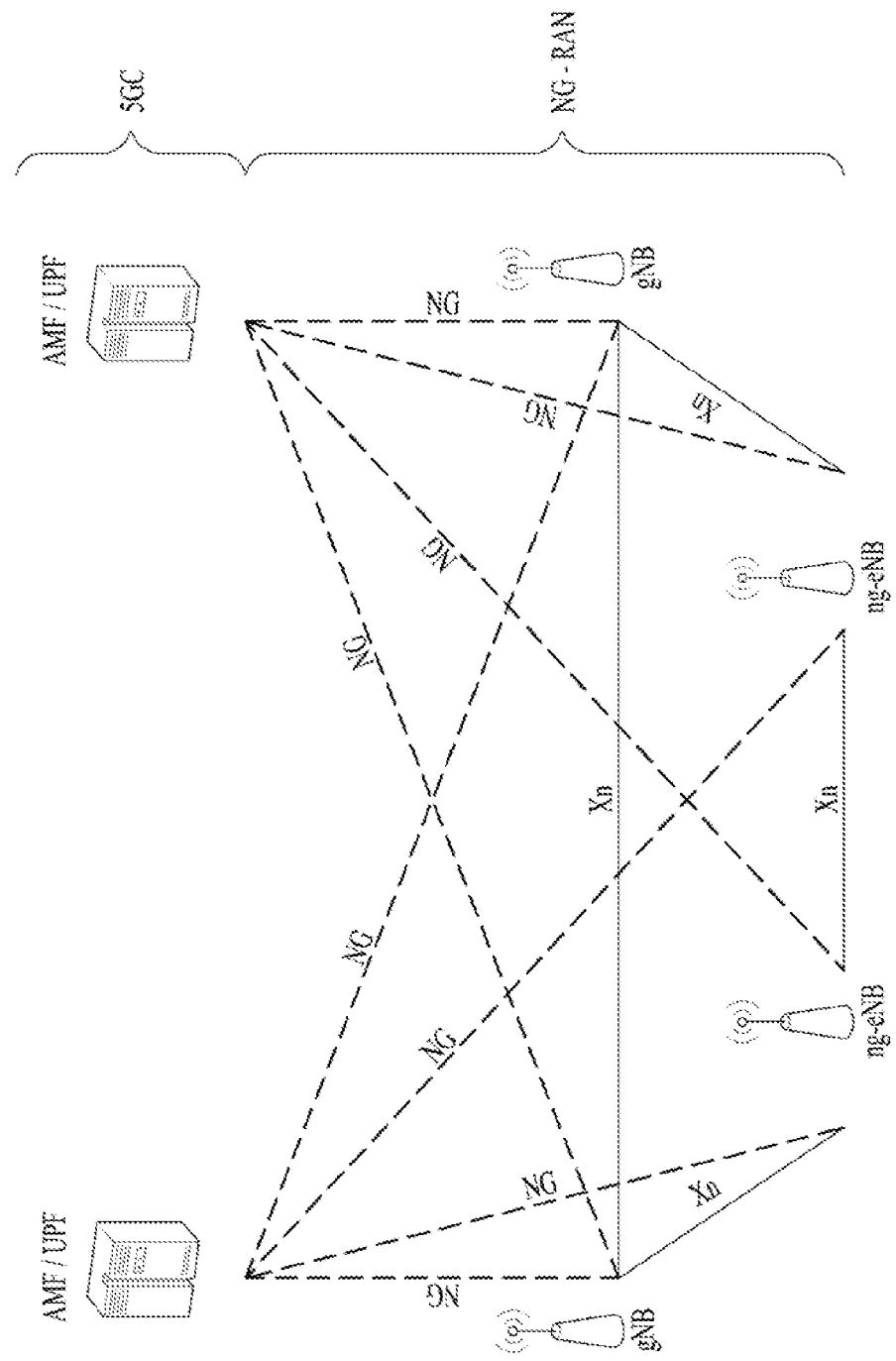
FIG. 4A is a block diagram illustrating network structure of NG Radio Access Network (NG-RAN) architecture.
Figure 4B:
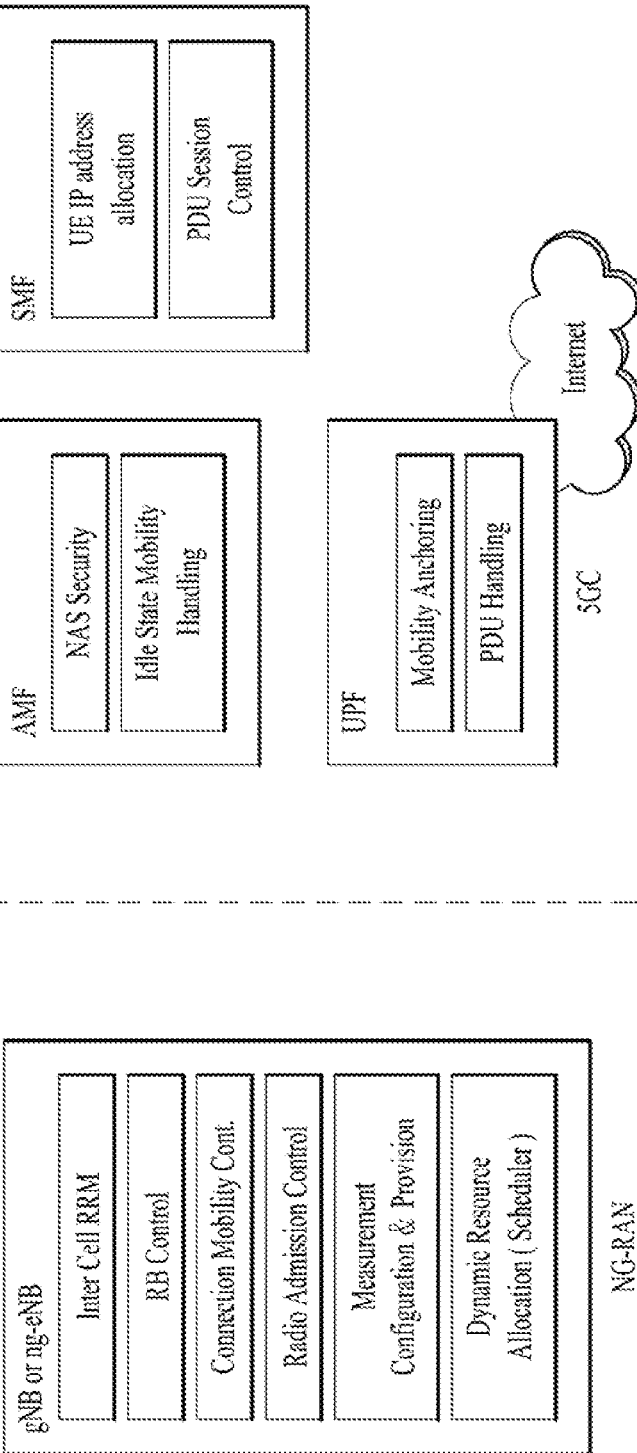
FIG. 4B is a block diagram depicting architecture of functional Split between NG-RAN and 5G Core Network (5GC).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
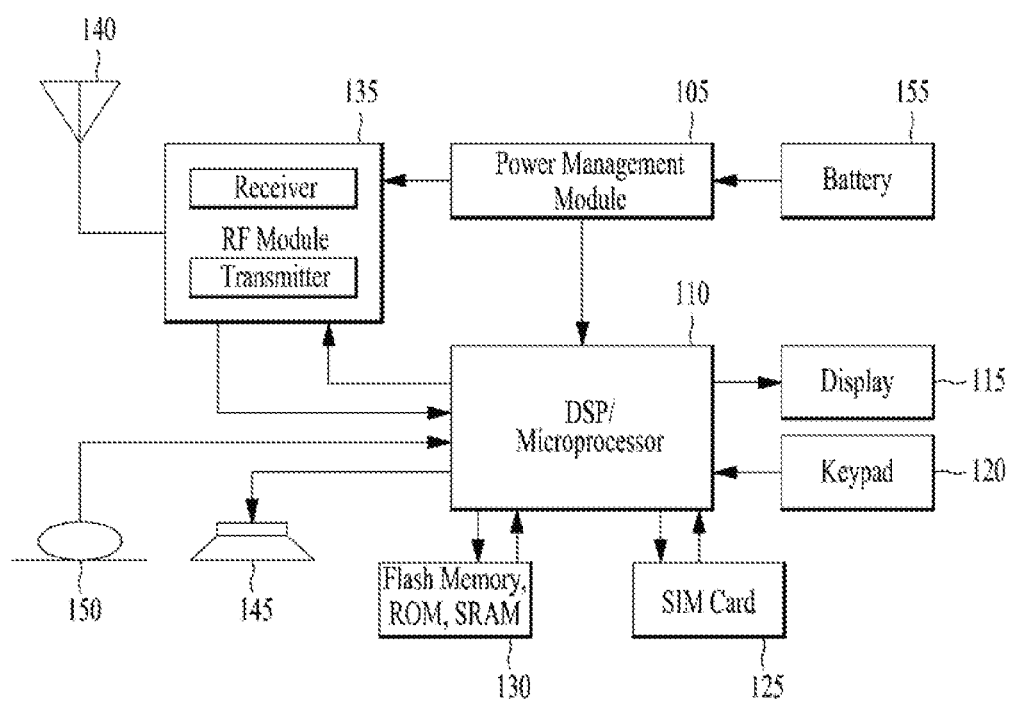
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 7 is examples for radio bearers supporting UL split operation in LTE and NR system.

Figure 7A:
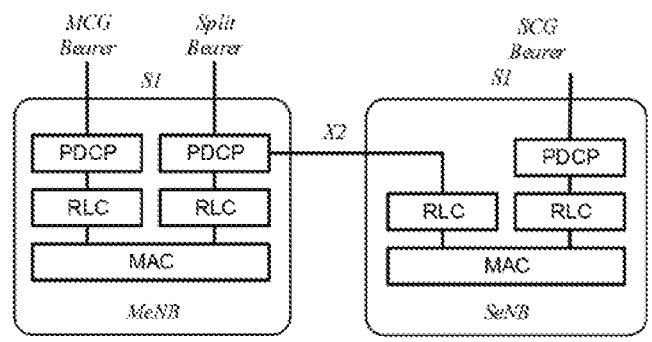
FIG. 7A is a diagram for Radio Protocol Architecture for Dual Connectivity (DC)

FIG. 7A is a diagram for Radio Protocol Architecture for Dual Connectivity (DC). In DC, the radio protocol architecture that a particular bearer uses depends on how the bearer is setup. Three bearer types exist: MCG bearer, SCG bearer and split bearer. Those three bearer types are depicted on FIG. 7A. RRC is located in MeNB and SRBs are always configured as MCG bearer type and therefore only use the radio resources of the MeNB. For split bearers, the S1-U connection to the S-GW is terminated in the MeNB. PDCP data is transferred between the MeNB and the SeNB via X2-U. The SeNB and MeNB are involved in transmitting data of this bearer type over the Uu.

Figure 7B:
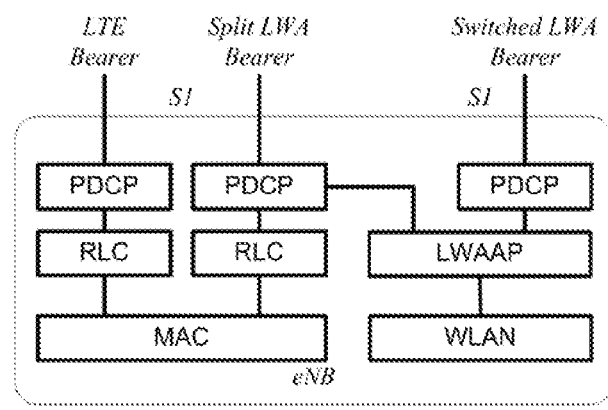
FIG. 7B is a diagram for LWA Radio Protocol Architecture for the Collocated Scenario.

FIG. 7B is a diagram for LWA Radio Protocol Architecture for the Collocated Scenario. In LTE-WLAN Aggregation (LWA), the radio protocol architecture that a particular bearer uses depends on the LWA backhaul scenario and how the bearer is set up. Two bearer types exist for LWA: split LWA bearer and switched LWA bearer. FIG. 7B is for the collocated scenario. LWA supports split bearer operation where the PDCP sublayer supports in-sequence delivery of upper layer PDUs based on the reordering procedure introduced for DC.

Figure 7C:
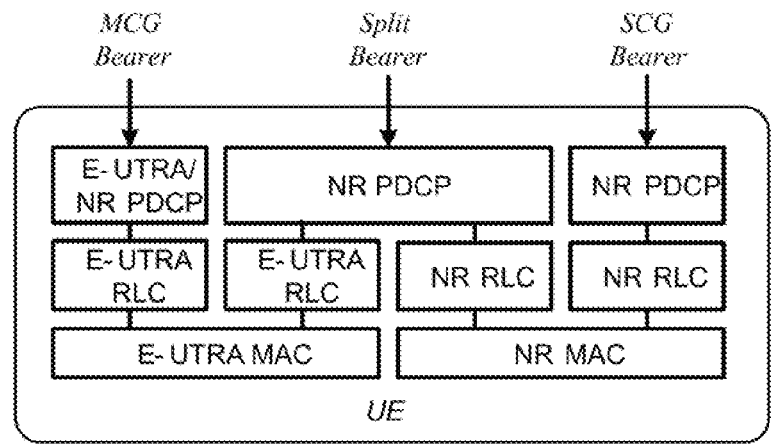
FIG. 7C is a diagram for Radio Protocol Architecture for MCG, SCG and split bearers from a UE perspective in MR-DC with EPC (EN-DC)
Figure 7D:
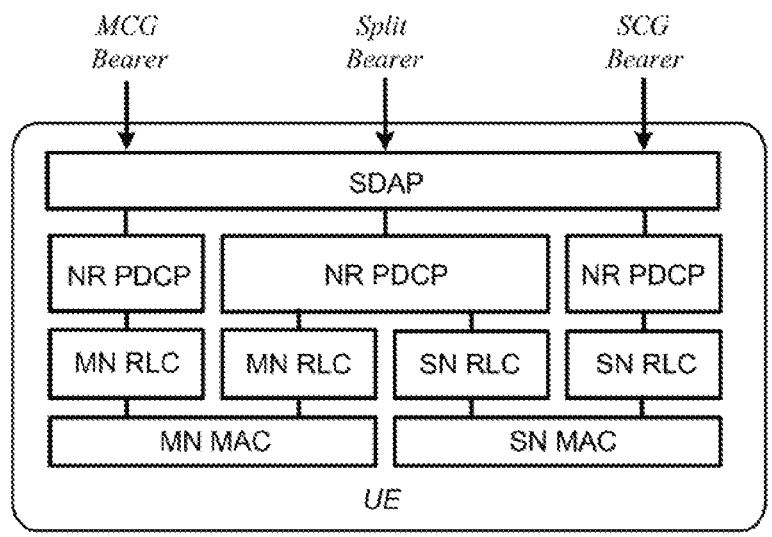
FIG. 7D is a diagram for Radio Protocol Architecture for MCG, SCG and split bearers from a UE perspective in MR-DC with 5GC (NGEN-DC, NE-DC)

FIG. 7C is a diagram for Radio Protocol Architecture for MCG, SCG and split bearers from a UE perspective in MR-DC with EPC (EN-DC), and FIG. 7D is a diagram for Radio Protocol Architecture for MCG, SCG and split bearers from a UE perspective in MR-DC with 5GC (NGEN-DC, NE-DC).

In MR-DC, from a UE perspective, three bearer types exist: MCG bearer, SCG bearer and split bearer. These three bearer types are depicted in FIG. 7C for MR-DC with EPC (EN-DC) and in FIG. 7D for MR-DC with 5GC (NGEN-DC, NE-DC).

For EN-DC, the network can configure either E-UTRA PDCP or NR PDCP for MCG bearers while NR PDCP is always used for SCG and split bearers.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

Figure 7E:
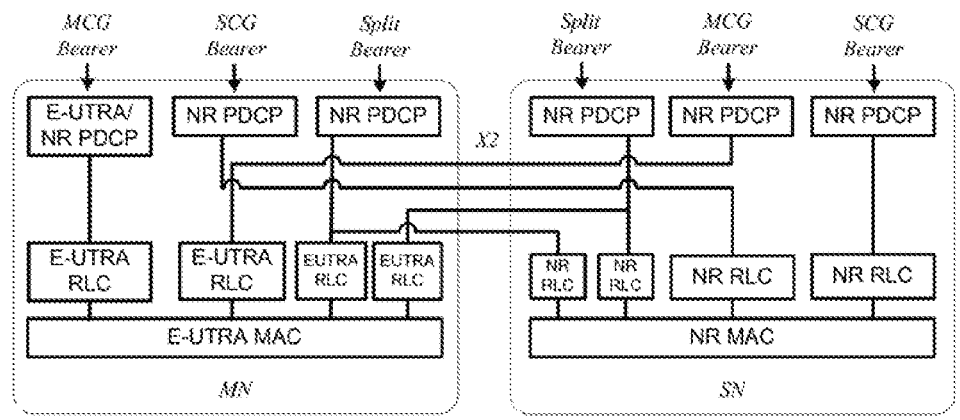
FIG. 7E is a diagram for Network side protocol termination options for MCG, SCG and split bearers in MR-DC with EPC (EN-DC)
Figure 7F:
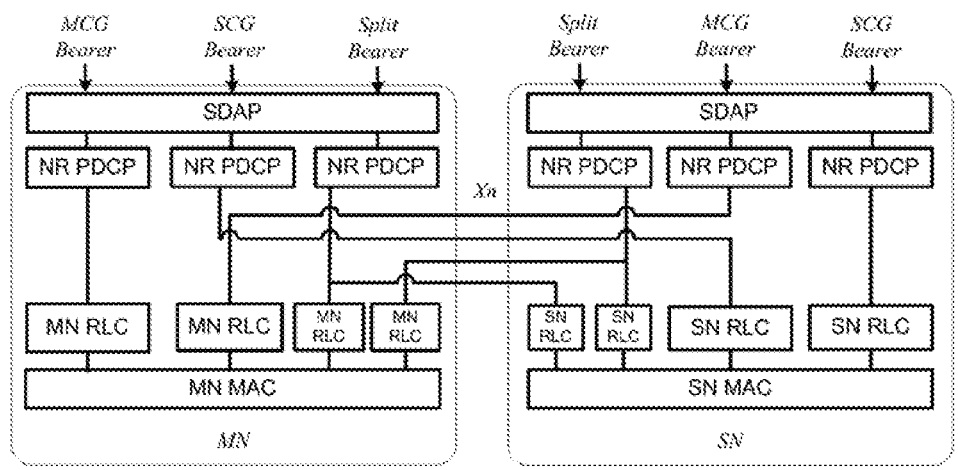
FIG. 7F is a diagram for Network side protocol termination options for MCG, SCG and split bearers in MR-DC with 5GC (NGEN-DC, NE-DC).

FIG. 7E is a diagram for Network side protocol termination options for MCG, SCG and split bearers in MR-DC with EPC (EN-DC), and FIG. 7F is a diagram for Network side protocol termination options for MCG, SCG and split bearers in MR-DC with 5GC (NGEN-DC, NE-DC).

These split bearer structures mentioned above have common in that a transmitting PDCP entity is associated with two RLC entities. Since one PDCP entity and two RLC entities are configured for a radio bearer, and each of RLC entities is associated with a respective MAC entity, we discussed how to deal with PDCP data volumes in the past in the UL split operation.

Figure 8:
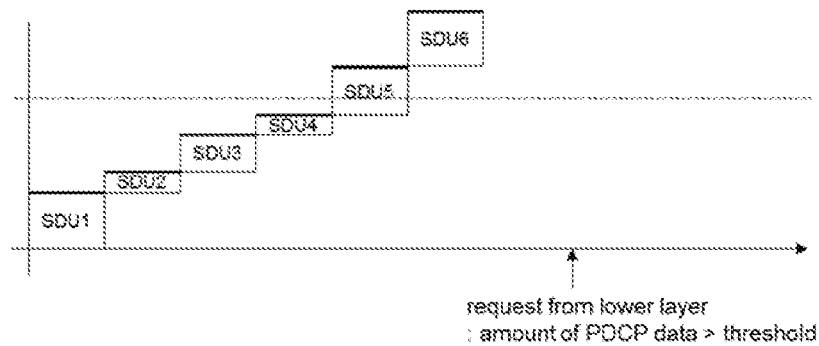
FIG. 8 is an example for operation using LTE threshold based approach for uplink split bearer.

FIG. 8 is an example for operation using LTE threshold based approach for uplink split bearer.

The PDCP entity indicates PDCP data volume to a MAC entity when there is change in PDCP data volume (or every TTI). Based on the change in PDCP data volume, the MAC entity may trigger BSR if triggering condition is met, e.g. if PDCP data volume is changed from 0 to finite value.

For UL split bearers in Rel-12 of 3GPP, the PDCP entity indicates the PDCP data volume to only one MAC entity depending on the configuration (ul-DataSplitDRB-ViaSCG). For the other MAC entity, the PDCP entity does not indicate PDCP data volume at all. If the total amount of PDCP data volume is equal to or larger than ul-DataSplitThreshold, the PDCP entity indicate the PDCP data volume to both the MAC entity configured for SCG and the MAC entity configured for MCG.

In Rel-13 of 3GPP, indication behavior of the PDCP entity is changed due to the introduction of threshold. In LTE DC, for uplink split bearer, a threshold based approach is used in uplink data transmission and buffer status reporting. The UE is configured with a threshold (ul-DataSplitThreshold), and the PDCP entity compares the amount of data available for transmission in the PDCP entity with the threshold. For PDCP PDU submission to lower layer, the PDCP entity performs comparison when the PDCP entity is requested to submit PDCP PDUs from lower layers. If amount of PDCP data exceeds the threshold, the PDCP entity submits the PDCP PDU to either RLC entity for MCG or SCG. Otherwise if amount of PDCP data doesn't exceed the threshold, the PDCP entity submits the PDCP PDU to one RLC entity which is configured by the eNB (ul-DataSplitDRB-ViaSCG).

So, from Rel-13, if the total amount of PDCP data volume is less than ul-DataSplitThreshold, the PDCP entity indicates the PDCP data volume to a MAC entity configured for SCG, only if ul-DataSplitDRB-ViaSCG is set to TRUE by upper layer, while the PDCP entity indicates the PDCP data volume as 0 to the MAC entity configured for MCG.

In Rel-14 of 3GPP, for uplink LWA bearers, if ul-LWA-DataSplitThreshold is configured and the data available for transmission is larger than or equal to ul-LWA-DataSplitThreshold, the PDCP entity indicates the PDCP data volume to the MAC entity. If ul-LWA-DataSplitThreshold is configured and the PDCP data volume is less than or ul-LWA-DataSplitThreshold, the PDCP entity indicates the PDCP data volume as 0 to the MAC entity if ul-LWA-DRB-ViaWLAN is set to TRUE by upper layers. Else, the PDCP entity indicates the PDCP data volume to the MAC entity. For LWA bearers, only the data that may be sent over LTE (i.e., excluding UL data already sent or decided to be sent over WLAN) is considered as "data available for transmission".

In LTE DC, the PDCP entity uses both paths only if PDCP data volume is high while using one configured path if PDCP data volume is low. The reason of using PDCP data volume as a threshold is to use both paths when many PDCP data is arrived at the PDCP entity considering that using one path is sufficient when there is not many PDCP data arriving at the PDCP entity.

Figure 9:
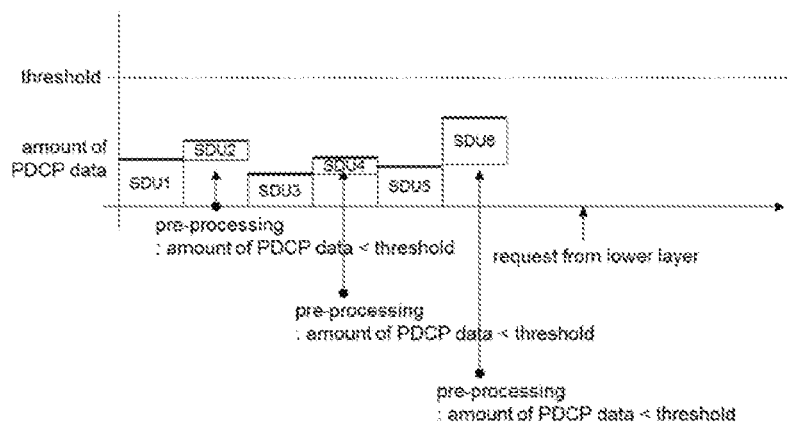
FIG. 9 is an example for pre-processing with threshold based approach.

FIG. 9 is an example for pre-processing with threshold based approach.

In NR, there are some agreements in the UL split operation. First, LTE threshold based mechanism is used for UL bearer split in LR. Second, pre-processing is allowed in the split bearer case, similar to single carrier case. How much pre-processing is done is left to UE implementation. And lastly, the PDCP entity should ensure that not more than half PDCP SN space is allocated.

More specifically, pre-processing is an important key to consider when designing a Layer 2 protocol. In this sense, it was agreed that RLC concatenation is removed and RLC delivers out-of sequence RLC SDU to upper layer.

However, for split bearer, LTE threshold based approach may prevent use of two uplink paths when pre-processing is performed in the PDCP entity. In case of pre-processing, LTE threshold based approach would mean that the PDCP entity compares the amount of PDCP data to the threshold when the PDCP entity performs pre-processing even before the PDCP entity is requested to deliver PDCP PDUs. If the PDCP entity performs pre-processing frequently, e.g., for every PDCP SDU reception, the amount of PDCP data is not likely to exceed the threshold. Accordingly, the PDCP entity would submit the PDCP SDU always to one path.

However, we still see some problem in using PDCP data volume as threshold even in normal scheduling case. The problem comes from using one and the same threshold for determining whether to use both paths or to use only one path.

If PDCP data volume is increasing and becomes larger than the threshold, the PDCP entity starts to use both paths. Then, PDCP data volume would soon become less than the threshold. Accordingly, the PDCP entity starts to use one path. As soon as the PDCP entity starts to use one path, it is likely that PDCP data volume exceeds the threshold again. In summary, PDCP data volume is frequently alternating above threshold and below threshold. We consider that this frequent change of PDCP data volume around the threshold would make the network scheduling more complex. Once the gNB/eNB is reported the buffer size from the UE, the gNB/eNB would schedule the UE. However, the UL grant may not be used by the the PDCP entity if PDCP data volume becomes less than the threshold due to UL grant from other gNB/eNB. In addition, when the PDCP entity starts to use two paths, the UE may trigger BSR because PDCP data is considered to become available for the path which has not be used previously.

In order to allow use both paths of split bearer in pre-processing, a new threshold based approach is required.

Figure 10:
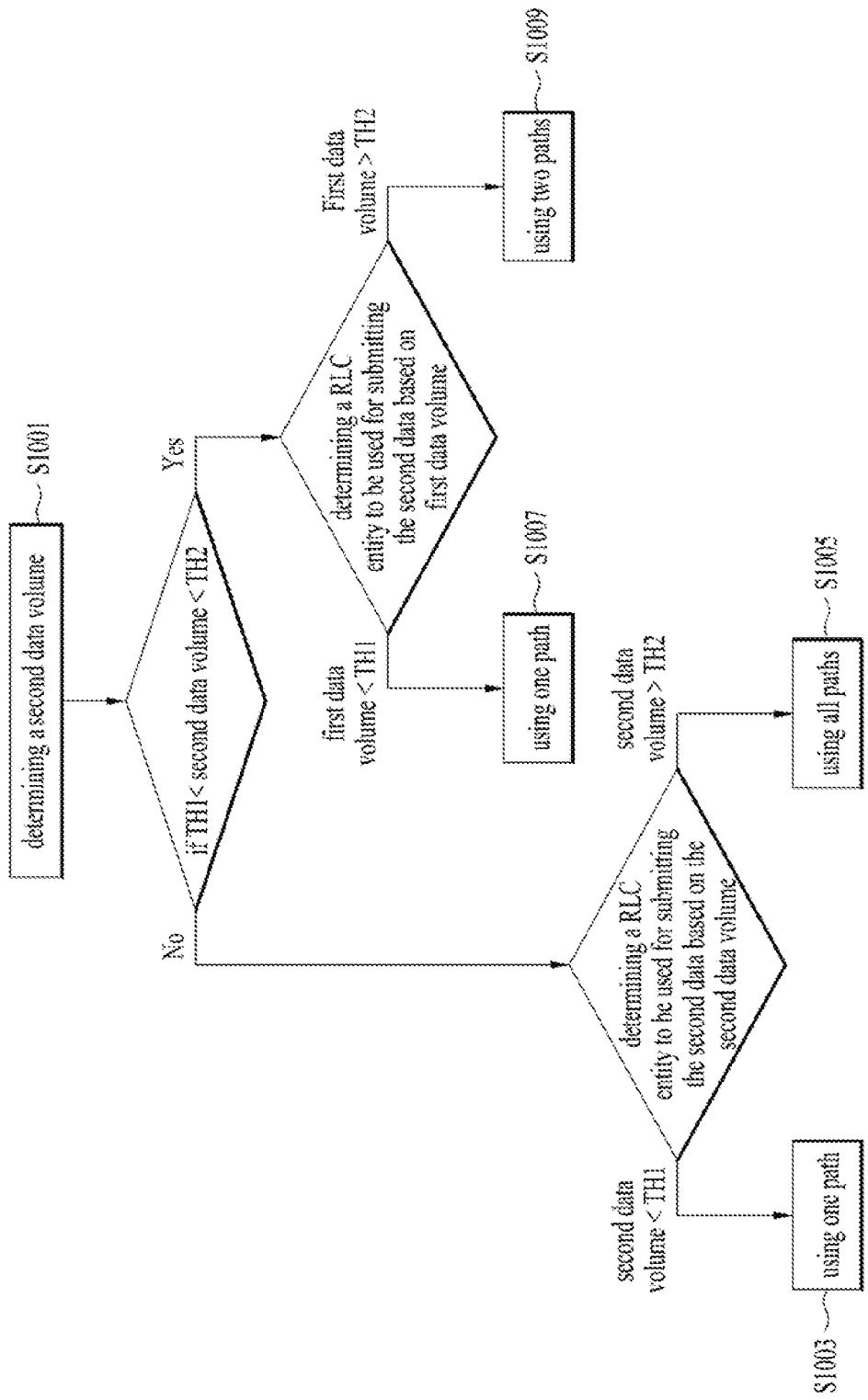
FIG. 10 is a conceptual diagram handling for an uplink split operation in wireless communication system according to embodiments of the present invention.

FIG. 10 is a conceptual diagram handling for an uplink split operation in wireless communication system according to embodiments of the present invention.

In this invention, for a PDCP of a split bearer, the PDCP entity is configured with two thresholds, i.e., TH1 and TH2, (TH1 is less than TH2), where one is for condition to start using two paths while the other one is for condition to start using one path.

We consider that, if PDCP data volume is currently increasing, it is likely that PDCP data volume keeps increasing for a while whereas if PDCP data volume is currently decreasing, it is likely that PDCP data volume keeps decreasing for a while. Therefore, it would be reasonable to keep using previous path(s), either all (preferably, two) paths or one path, for a while. In other words, if PDCP data volume is between those two thresholds, the PDCP entity can keep using the previous path(s).

In other words, this idea is different from the previous art in that the amount of the first data, was transmitted immediately before the second data, is considered when determining a path in which the second data is to be transmitted.

When first PDCP data becomes available for transmission in a PDCP entity, the PDCP entity indicates first data volume to a first and/or a second MAC entities. The UE determines a path where the first PDCP data is submitted based on the first data volume if there is no data available for transmission in the PDCP entity.

Let's assume that the PDCP is configured with two different thresholds, i.e., TH1 and TH2, where TH1 is less than TH2.

Preferably, for the purpose of MAC buffer status reporting, the transmitting PDCP entity shall consider the following as PDCP data volume: i) PDCP SDUs for which no PDCP Data PDUs have been constructed, ii) PDCP Data PDUs that have not been submitted to lower layers, and iii) PDCP Control PDUs. So, when the PDCP entity generates data (i.e. PDCP Control PDUs), and receives data (i.e. PDCP SDUs received from upper layers), the data becomes available for transmission in the PDCP entity.

Preferably, the first data volume includes an amount of the PDCP data available for transmission and RLC data volume pending for initial transmission in the two associated RLC entities if pre-processing is configured for the PDCP entity.

Preferably, if the transmitting PDCP entity is associated with two RLC entities and the pre-processing is configured for the PDCP entity, the UE should minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

The method of determining an initial path for submitting the first data is the same as the legacy operation. It is advantageous for the UE to set a legacy TH used for determining the path to TH1. The initial path is a path to be used to submit initial data, when the first PDCP data becomes available for transmission from zero.

If the first data volume is less than TH1, the PDCP entity use a path for submitting the first PDCP data. So, the UE indicates the PDCP data volume to a MAC entity associated with the primary RLC entity when indicating the PDCP data volume to a MAC entity for BSR triggering and Buffer Size calculation, and the UE submits the first PDCP data to the primary RLC entity.

And if the first data volume is larger than TH1, the PDCP entity use all paths for submitting the first PDCP data. So, the UE indicates the PDCP data volume to both the MAC entity associated with the primary RLC entity and the MAC entity associated with the secondary RLC entity when indicating the PDCP data volume to a MAC entity for BSR triggering and Buffer Size calculation, and the UE submits the first PDCP data to either the primary RLC entity or the secondary RLC entity.

The other method of determining an initial path is advantageous for the eNB. This method is to set a legacy TH used for determining the path to TH2.

If the first data volume is less than TH2, the PDCP entity use a path for submitting the first PDCP data. So, the UE indicates the PDCP data volume to a MAC entity associated with the primary RLC entity when indicating the PDCP data volume to a MAC entity for BSR triggering and Buffer Size calculation, and the UE submits the first PDCP data to the primary RLC entity.

And if the first data volume is larger than TH2, the PDCP entity use all paths for submitting the first PDCP data. So, the UE indicates the PDCP data volume to both the MAC entity associated with the primary RLC entity and the MAC entity associated with the secondary RLC entity when indicating the PDCP data volume to a MAC entity for BSR triggering and Buffer Size calculation, and the UE submits the first PDCP data to either the primary RLC entity or the secondary RLC entity.

Anyway, after the path for submitting the first data is determined to be one path or all path according to above mentioned, when second data becomes available for transmission in the PDCP entity, the UE determines a second data volume for indicating the second data volume to the first MAC entity and/or a second MAC entity after indicating the first data volume to the first MAC entity and/or the second MAC entity (S1001).

Preferably, for the purpose of MAC buffer status reporting, the transmitting PDCP entity shall consider the following as PDCP data volume: i) PDCP SDUs for which no PDCP Data PDUs have been constructed, ii) PDCP Data PDUs that have not been submitted to lower layers, and iii) PDCP Control PDUs. So, when the PDCP entity generates data (i.e. PDCP Control PDUs), and receives data (i.e. PDCP SDUs received from upper layers), the data becomes available for transmission in the PDCP entity.

Preferably, the second data volume includes amount of the PDCP data available for transmission and RLC data volume pending for initial transmission in the two associated RLC entities if pre-processing is configured for the PDCP entity.

If the second data volume is less than TH1, the PDCP entity use a path for submitting the second PDCP data according to legacy mechanism (S1003). So, the UE indicates the PDCP data volume to a MAC entity associated with the primary RLC entity when indicating the PDCP data volume to a MAC entity for BSR triggering and Buffer Size calculation, and the UE submits the first PDCP data to the primary RLC entity.

Also, if the second data volume is larger than TH2, the PDCP entity use two paths for submitting the second PDCP data according to legacy mechanism (S1005). So, the UE indicates the PDCP data volume to both the MAC entity associated with the primary RLC entity and the MAC entity associated with the secondary RLC entity when indicating the PDCP data volume to a MAC entity for BSR triggering and Buffer Size calculation, and the UE submits the first PDCP data to either the primary RLC entity or the secondary RLC entity.

Our invention proposes that if the second data volume becomes larger than TH1 but smaller than TH2, the PDCP entity changes to use either one path or two paths depending on whether the first PDCP data volume is smaller than TH1 or larger than TH2.

According to our invention, if second data volume is larger than a TH1 and less than TH2, the UE can keep using the previous path when determining a RLC entity to be used for submitting the second data based on first data volume.

If the first data volume is less than TH1, since the PDCP entity used one path, the UE keeps using one path (S1007). When the PDCP entity decides to keep using one path: i) the one path, which is associated with a primary RLC entity, is configured by a network via RRC signaling. The primary RLC entity operates for a Master Node for dual connectivity. ii) PDCP data volume is indicated to a MAC entity associated with the primary RLC entity, and iii) PDCP data is submitted to the primary RLC entity.

So, the PDCP entity indicates the PDCP data volume to a MAC entity associated with the primary RLC entity when indicating the PDCP data volume to a MAC entity for BSR triggering and Buffer Size calculation, and the UE submits the first PDCP data to the primary RLC entity.

If the first data volume is larger than the TH2, since the PDCP entity used all paths, the UE keeps using all/both paths (S1009). When the PDCP decides to keep using all/both paths: i) PDCP data volume is indicated to all MAC entities associated with all RLC entities, and ii) PDCP data is submitted to one of RLC entities.

So, the UE indicates the PDCP data volume to both the MAC entity associated with the primary RLC entity and the MAC entity associated with the secondary RLC entity when indicating the PDCP data volume to a MAC entity for BSR triggering and Buffer Size calculation, and the UE submits the first PDCP data to either the primary RLC entity or the secondary RLC entity.

In view of a MAC entity, when a first MAC entity associated with the primary RLC entity receives the indication indicating PDCP data volume, the first MAC entity triggers a buffer status reporting if the second data belongs to a logical channel with higher priority than the priorities of the logical channels which belong to any LCG and for which data is already available for transmission. Otherwise, when a second MAC entity associated with the secondary RLC entity receives the indication indicating PDCP data volume, the second MAC entity triggers a buffer status reporting if the second data belongs to a logical channel with higher priority than the priorities of the logical channels which belong to any LCG and for which data is already available for transmission.

When the first MAC entity triggers a buffer status reporting, the first MAC entity the triggered buffer status reporting to a first base station for the first MAC entity. And when the second MAC entity triggers a buffer status reporting, the second MAC entity the triggered buffer status reporting to a second base station for the second MAC entity.

In view of a RLC entity, when a primary RLC entity receives the PDCP data, the PDCP data is transmitted to a first base station for the primary RLC entity. And when a second RLC entity receives the PDCP data, the PDCP data is transmitted to a second base station for the secondary RLC entity.

Figure 11:
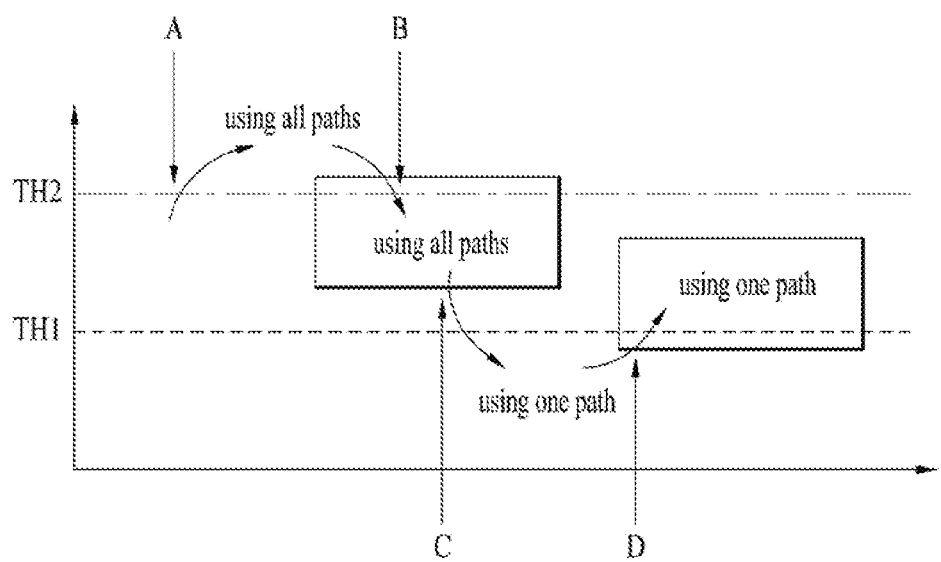
FIG. 11 is an example for handling for an uplink split operation in wireless communication system according to embodiments of the present invention.

FIG. 11 is an example for handling for an uplink split operation in wireless communication system according to embodiments of the present invention.

If PDCP data volume becomes a value which is larger than TH2 from a value which less than TH2 (A), the PDCP entity determines using all paths of the split bearer.

If PDCP data volume becomes a value which is larger than TH1 but smaller than TH2, from a value which is larger than TH2 (B), the PDCP entity keeps using all paths of the split bearer.

If PDCP data volume becomes a value which smaller than TH1 from a value which larger than TH1 (C), the PDCP entity determines using one path of the split bearer.

If PDCP data volume becomes a value which is larger than TH1 but smaller than TH2, from a value which is smaller than TH1 (D), the PDP entity keeps using one path of the split bearer.

When the PDCP decides to keep using one path: i) the one path, which is associated with a primary RLC entity, is configured by a network via RRC signaling. The primary RLC entity operates for a Master Node for dual connectivity. ii) PDCP data volume is indicated to a MAC entity associated with the primary RLC entity, and iii) PDCP data is submitted to the primary RLC entity.

When the PDCP decides to keep using all/both paths: i) PDCP data volume is indicated to all MAC entities associated with all RLC entities, and ii) PDCP data is submitted to one of RLC entities.

We think having one threshold and using PDCP data volume as the threshold may bring undesirable UL grant waste because PDCP is not allowed to use the received UL grant if PDCP data volume is lower than the threshold and the UL grant is received from not configured gNB/eNB. Given that PDCP data volume may frequently go up and down around the threshold, the wasted UL grant may not be negligible. Therefore, we propose that considering by using two threshold, where higher one is for condition to start using two paths while the other lower one is for condition to start using one path. If two thresholds is used, the UE keeps using the previous paths if PDCP data volume becomes between two thresholds.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

While the above-described method has been described centering on an example applied to the 3GPP LTE and NR system, the present invention is applicable to a variety of wireless communication systems in addition to the 3GPP LTE and NR system.

What is claimed is:

1. A method performed by a User Equipment (UE) in a wireless communication system, the method comprising:
   determining a second data volume when a Packet Data Convergence Protocol (PDCP) entity indicates the second data volume to at least one of a first Medium Access Control (MAC) entity or a second MAC entity after indicating a first data volume to at least one of the first MAC entity or the second MAC entity, wherein the first data volume is an amount of first data available for transmission in the PDCP entity, and the second data volume is an amount of second data available for transmission in the PDCP entity,
   wherein the PDCP entity is related with a primary Radio Link Control (RLC) entity and a secondary RLC entity for a radio bearer, and the primary RLC entity is related with the first MAC entity and the secondary RLC entity is related with the second MAC entity;
   based on the second data volume being larger than a first threshold and less than a second threshold and the first data volume being less than the first threshold, indicating, by the PDCP entity, the second data volume to the first MAC entity only; and
   based on the second data volume being larger than a first threshold and less than a second threshold and the first data volume being larger than the second threshold, indicating, by the PDCP entity, the second data volume to both the first MAC entity and the second MAC entity.

2. The method according to claim 1, wherein based on the second data volume being larger than a first threshold and less than a second threshold and the first data volume being less than the first threshold, the primary RLC entity, where the first data was submitted, is determined to be used for submitting the second data.

3. The method according to claim 2, wherein based on the second data volume being larger than a first threshold and less than a second threshold and the first data volume being larger than the second threshold, either the primary RLC entity or the secondary RLC entity is determined to be used for submitting the second data regardless of which RLC entity the first data was submitted to.

4. The method according to claim 3, further comprising:
   transmitting the second data to a first base station for the primary RLC entity, based on the second data being submitted to the primary RLC entity; and
   transmitting the second data to a second base station for the secondary RLC entity, based on the second data being submitted to the secondary RLC entity.

5. The method according to claim 1, further comprising:
   triggering, by the first MAC entity, a buffer status reporting based on the second data belonging to a logical channel with higher priority than the priorities of the logical channels which belong to any Logical Channel Group (LCG) and for which data is already available for transmission, based on the PDCP entity indicating the second data volume to the first MAC entity; and
   transmitting the triggered buffer status reporting to a first base station for the first MAC entity.

6. The method according to claim 1, further comprising:
   triggering, by the second MAC entity, a buffer status reporting based on the second data belonging to a logical channel with higher priority than the priorities of the logical channels which belong to any Logical Channel Group (LCG) and for which data is already available for transmission, based on the PDCP entity indicating the second data volume to the second MAC entity; and
   transmitting the triggered buffer status reporting to a second base station for the second MAC entity.

7. The method according to claim 1, wherein the first threshold is less than the second threshold.

8. A User Equipment (UE) operating in a wireless communication system, the UE comprising:
   a Radio Frequency (RF) module; and
   a processor operably coupled with the RF module and configured to:
   determine a second data volume when a Packet Data Convergence Protocol (PDCP) entity indicates the second data volume to at least one of a first Medium Access Control (MAC) entity or a second MAC entity after indicating a first data volume to at least one of the first MAC entity or the second MAC entity, wherein the first data volume is an amount of first data available for transmission in the PDCP entity, and the second data volume is an amount of second data available for transmission in the PDCP entity,
   wherein the PDCP entity is related with a primary Radio Link Control (RLC) entity and a secondary RLC entity for a radio bearer, and the primary RLC entity is related with the first MAC entity and the secondary RLC entity is related with the second MAC entity;
   based on the second data volume being larger than a first threshold and less than a second threshold and the first data volume being less than the first threshold, indicate, by the PDCP entity, the second data volume to the first MAC entity only; and
   based on the second data volume being larger than a first threshold and less than a second threshold and the first data volume being larger than the second threshold, indicate, by the PDCP entity, the second data volume to both the first MAC entity and the second MAC entity.

9. The UE according to claim 8, wherein based on the second data volume being larger than a first threshold and less than a second threshold and the first data volume being less than the first threshold, the primary RLC entity, where the first data was submitted, is determined to be used for submitting the second data.

10. The UE according to claim 9, wherein based on the second data volume being larger than a first threshold and less than a second threshold and the first data volume being larger than the second threshold, either the primary RLC entity or the secondary RLC entity is determined to be used for submitting the second data regardless of which RLC entity the first data was submitted to.

11. The UE according to claim 8, wherein the processor is further configured to:
  trigger, by the first MAC entity, a buffer status reporting based on the second data belonging to a logical channel with higher priority than the priorities of the logical channels which belong to any Logical Channel Group (LCG) and for which data is already available for transmission, based on the PDCP entity indicating the second data volume to the first MAC entity; and
  transmit the triggered buffer status reporting to a first base station for the first MAC entity.

12. The UE according to claim 8, wherein the processor is further configured to:
  trigger, by the second MAC entity, a buffer status reporting based on the second data belonging to a logical channel with higher priority than the priorities of the logical channels which belong to any Logical Channel Group (LCG) and for which data is already available for transmission, based on the PDCP entity indicating the second data volume to the second MAC entity; and
  transmit the triggered buffer status reporting to a second base station for the second MAC entity.

13. The UE according to claim 8, wherein the processor is further configured to:
  transmit the second data to a first base station for the primary RLC entity, based on the second data being submitted to the primary RLC entity, and
  transmit the second data to a second base station for the secondary RLC entity, based on the second data being submitted to the secondary RLC entity.

14. The UE according to claim 8, wherein the first threshold is less than the second threshold.

* * * * *